No Printed Specification Available
9070X
Dart & Wood,
Water Wheel,
Patented Sept. 9, 1835.
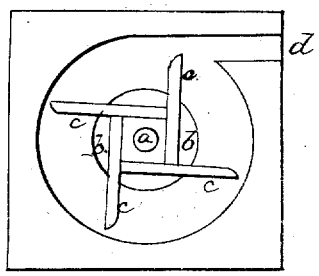
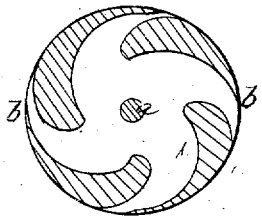
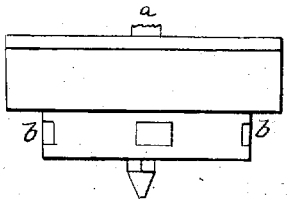
N. PETERS, PHOTO-LITHOGRAPHER, WASHINGTON, D. C.

Jehiel McDart & Stephen Wood. New York State

Letters Patent

The Schedule referred to in these Letters Patent and making part of the same containing a description in the words of the said Jehiel McDart and Stephen Wood themselves of their improvement in the application of water power to mills & machinery Be it known that We Jehiel McDart of Truxton in the County of Courtland and State of New York and Stephen Wood of the Town of Fabius County of Onandaga and State aforesaid have made and invented an improvement in the application of the propelling power of water to Mills and machinery as follows: Place a shaft in a perpendicular position and on or near the lower end of the same place a wheel with reacting Buckets in the form of a reaction wheel receiving the water in the centre and discharging it at the outer rim or edge of the wheel and on the same shaft above the reaction wheel, with or without a deck between, place another wheel having arms to serve as buckets to receive the force or power of the water passing through or attached to said shaft and enclose it with a circular curve with an opening to receive the water and conduct its force and pressure upon the said arms or buckets through the centre of which wheel the water is discharged in force into the centre of the reaction wheel first mentioned and expends its power as it escapes from the same and mingles with the surrounding flood - The invention here claimed and desired to be secured by letters patent consists in the increase of power which is obtained in the above arrangement of the central discharge or whirlpool wheel & the reaction wheel by securing and combining the benefit and advantages of both in the same movement & operation and with the same and even a less quantity of water than is required for either of them separately. Fabius Onondaga County New York June 20th 1835

Witnesses { George Pettet
Harriet C. Pettet

Jehiel McDart
Stephen Wood

Recd. [illegible]

238 [illegible]

[illegible] [illegible]